United States Patent
Skogö et al.

(10) Patent No.: US 10,372,203 B2
(45) Date of Patent: Aug. 6, 2019

(54) GAZE-CONTROLLED USER INTERFACE WITH MULTIMODAL INPUT

(71) Applicant: Tobii AB, Danderyd (SE)

(72) Inventors: Mårten Skogö, Danderyd (SE); John Mikael Elvesjö, Stockholm (SE); Anders Olsson, Stockholm (SE)

(73) Assignee: Tobii AB, Danderyd (SE)

( * ) Notice: Subject to any disclaimer, the term of this patent is extended or adjusted under 35 U.S.C. 154(b) by 240 days.

(21) Appl. No.: 14/290,634

(22) Filed: May 29, 2014

(65) Prior Publication Data

US 2014/0354539 A1 Dec. 4, 2014

(30) Foreign Application Priority Data

May 30, 2013 (GB) .................................. 1309708.4

(51) Int. Cl.
*G06F 3/01* (2006.01)
*G06F 3/03* (2006.01)

(52) U.S. Cl.
CPC ............ *G06F 3/013* (2013.01); *G06F 3/0304* (2013.01)

(58) Field of Classification Search
None
See application file for complete search history.

(56) References Cited

U.S. PATENT DOCUMENTS

| | | |
|---|---|---|
| 5,367,315 A | 11/1994 | Pan |
| 5,517,021 A | 5/1996 | Kaufman et al. |
| 5,867,654 A * | 2/1999 | Ludwig .................. G06Q 10/10 348/E7.081 |
| 5,977,976 A | 11/1999 | Maeda |
| 6,243,076 B1 | 6/2001 | Hatfield |
| 7,561,143 B1 | 7/2009 | Milekic |
| 8,235,529 B1 | 8/2012 | Raffle et al. |
| 8,594,374 B1 * | 11/2013 | Bozarth .................. G06F 21/36 382/103 |
| 2007/0094620 A1 * | 4/2007 | Park ...................... G06F 3/0481 715/862 |
| 2007/0164990 A1 | 7/2007 | Bjorklund et al. |

(Continued)

FOREIGN PATENT DOCUMENTS

| | | |
|---|---|---|
| EP | 1679577 A1 | 7/2006 |
| WO | WO 86/03863 A1 | 7/1986 |

*Primary Examiner* — Jennifer Mehmood
*Assistant Examiner* — Parul H Gupta
(74) *Attorney, Agent, or Firm* — Kilpatrick Townsend & Stockton LLP

(57) ABSTRACT

A personal computer system provides a gaze-controlled graphical user interface having a bidirectional and a unidirectional interaction mode. In the bidirectional interaction mode, a display shows one or more graphical controls in motion, each being associated with an input operation to an operating system. A gaze tracking system provides gaze point data of a viewer, and a matching module attempts to match a relative gaze movement against a relative movement of one of the graphical controls. The system includes a selector which is preferably controllable by a modality other than gaze. The system initiates a transition from the unidirectional interaction mode to the bidirectional interaction mode in response to an input received at the selector. The display then shows graphical controls in motion in a neighborhood of the current gaze point, as determined based on current gaze data.

20 Claims, 6 Drawing Sheets

(56) References Cited

U.S. PATENT DOCUMENTS

| | | | |
|---|---|---|---|
| 2010/0122162 A1* | 5/2010 | Terada | G06F 1/1626 715/702 |
| 2011/0169730 A1 | 7/2011 | Sugihara | |
| 2011/0254865 A1 | 10/2011 | Yee et al. | |
| 2012/0230547 A1 | 9/2012 | Durnell et al. | |
| 2013/0127980 A1* | 5/2013 | Haddick | G06F 3/013 348/14.08 |
| 2013/0246967 A1* | 9/2013 | Wheeler | G06F 3/012 715/784 |

* cited by examiner

GAZE-CONTROLLED USER INTERFACE WITH MULTIMODAL INPUT

CROSS-REFERENCE TO RELATED APPLICATIONS

This application claims the benefit of, and priority to, Application No. UK 1309708.4, filed May 30, 2013, the entire disclosure of which is incorporated by reference herein.

TECHNICAL FIELD

The invention disclosed herein generally relates to multimodal graphical user interfaces (GUIs). In particular, the invention relates to techniques for improving the usability of such interfaces, including their swiftness and accuracy, by combining different interaction modalities. In particular, the invention may improve or extend the functionalities of a gaze tracking system adapted to determine the gaze point of a viewer watching a visual display forming part of a portable or stationary personal computer device, a TV set, a heads-up display in a vehicle, a near-eye or head mounted display or a display in a communication device with imaging and computing capabilities, such as a mobile telephone.

BACKGROUND

Available gaze tracking equipment may at times suffer from poor accuracy, mainly due to poor head movement compensation in the gaze tracking algorithms. Since the head generally moves slowly compared to the eyes the poor accuracy can, as seen over a short period of time, take the form of a constant error term (error vector) in the measured gaze point. Calibration of such systems may prove problematic insofar as a series of measurements may be needed, wherein each calibration (e.g., a nine-point or twelve-point measurement) corresponds to a particular head position and may be relied upon whenever the user's head is in or near this position in the future. A calibration procedure with a series of measurements will be experienced as complex by many users and is prone to human errors.

Quite often, however, such gaze tracking equipment is in fact able to measure relative motion vectors with good accuracy as the constant error terms referred to above may be expected to cancel. This is one of the assumptions underlying gaze-based moving GUIs, in which a user submits a command to a computer system by following a motion path of a graphical control on a visual display rather than fixating a stationary locus of the graphical control. For instance, the computer system may be configured to interpret a user's gazing at a moving graphical control as an intentional input operation if it has proceeded for more than a predetermined minimum time period. As used herein, an "input operation" is to be understood broadly, encompassing all of view-controlling commands (e.g., a scroll operation), system commands (e.g., launching an application) and entry of new content (e.g., typing text in an application).

In addition to the visually distracting movements of the graphical controls, gaze-based moving GUIs share a certain disadvantage with gaze-based GUIs in general, namely, that the user's fear of making an inadvertent input just by looking at an object (for too long) may build up some discomfort associated with the GUI. Whether based on this insight or other factors, some developers of available gaze-based moving GUIs have provided these with a functionality of temporarily disabling the moving controls.

U.S. Pat. No. 6,243,076 discloses a purely gaze-actuated GUI, which intermittently displays moving visual targets that the user may fixate to make an input to the system. The moving visual targets move along fixed, repeating, preferably pre-calculated paths or along random paths. The applications executing on the system may query the user for input by placing the visual targets in motion and removing them from the display image when the application is satisfied with the input received so far. Alternatively, the user invokes one or more moving visual targets. The behaviour of the visual targets is similar to that of conventional dialogue boxes, except that the user may not dismiss the visual targets voluntarily. As such, whether the interface is to be in an input mode (with moving visual targets) or a non-input mode (with stationary visual targets) is left at the discretion of the application, so that each developer will be facing the task of balancing two conflicting interests as far as the user is concerned. Indeed, the interest of a high responsiveness and controllability requires a high propensity for the application to enter the input mode, while the goal of promoting a peaceful working environment would seem to advocate infrequent use of the input mode and returning to the non-input mode as soon as possible.

US20110169730 and U.S. Pat. No. 8,235,529 disclose further purely gaze-actuated GUIs. By fixating a predefined display area, a user of the GUI according to US20110169730 may trigger an input mode in which one or more icons move linearly over a portion of the display, and the GUI will activate a predetermined functionality in an associated personal computer system when it detects that a user is pursuing an icon. The motion of the one or more icons continues until the GUI notes that the user is not pursuing any of them. As stated, the GUI enters the input mode as a result of deliberate fixation of a certain activation area, which in the implementation translates into detecting a dwell time above some predetermined threshold time. Because the activation takes place in the error-sensitive mode, in which the GUI detects location rather than movement, the activation area should be chosen sufficiently large. Further, the GUI should be robust against inadvertent activation of the input mode—it may take several input steps to leave the input mode if it is entered by mistake—which speaks in favour of a long threshold time for activation. This however runs counter to the goal of providing an agile and convenient GUI.

It may be said that neither of these known GUIs meets the expectations of demanding users. At the very least, their inconveniences are so significant that most users, who are in a position to freely decide whether to use a gaze-based human-machine interface or a conventional interface with a hand-actuated pointing device, are likely to opt for the conventional interface.

SUMMARY

It is in view of the above limitations associated with the prior art that the present invention has been made. An object of the invention is to provide a personal computer system with a gaze-controlled GUI which is responsive to use, yet not stress-inducing. A further object is to provide a personal computer system with such gaze-controlled GUI which operates at high accuracy while demanding little or no time from the user for calibration. A further object is to provide a personal computer system with a gaze-controlled GUI which may be re-calibrated frequently without interfering noticeably with the user's activities. A still further object is to reduce the requirements placed on the hardware in a personal computer enabled to provide a gaze-controlled GUI.

As used herein, a personal computer system (or host system) may be one of a desktop or laptop computer, all-in-one computer, tablet computer, notebook, net book, TV, smart phone, personal digital assistant, digital camera, heads-up display in for instance a vehicle or a near-eye display or head mounted display such as that of Google Glass™ or Oculus Rift™ virtual reality display.

At least one of these objects is achieved by a method, computer program product and personal computer system with the features set forth in the independent claims. The dependent claims define embodiments of the invention.

A personal computer system comprises an operating system, a graphics module, a gaze tracking system and a matching module.

The graphics module controls a visual display associated with the gaze interaction system by way of a display signal. In a bidirectional interaction mode, the personal computer system outputs data to a viewer of the visual display and is ready to receive input data from the viewer via a gaze modality. In a unidirectional interaction mode, the personal computer system outputs data to the user, whereas the gaze modality is disabled as an input source or is used for a restricted range of inputs. In the unidirectional interaction mode, gaze input data may for instance influence the presentation of information on the visual display (decorative highlighting, energy-optimized selective backlighting, selective zoom, an indicator providing visual feedback of the current measured gaze point etc.) but may preferably not change the course of execution of an application. In the bidirectional interaction mode, the display signal is such that it causes the visual display to show one or more graphical controls (e.g., icons, symbols, elements). Preferably, each of the graphical controls is associated with at least one predefined input operation in the above sense, directed to the operating system or an application executing on the operating system.

The gaze tracking system provides gaze point data representing the viewer's gaze point at different points in time. The gaze point data is suitable at least for positioning the gaze point of the viewer. Clearly, such data may be processed with the purpose of finding a momentary motion vector or a trajectory of relative movements of the gaze point over time.

The matching module has access to data relating to each of said graphical controls, their relative movements, their associated predefined input operations to the personal computer system and, possibly, corresponding instructions to be supplied to the operating system or an application of the personal computer system. The matching module may be configured to repeatedly compare one or more relative gaze movements relating to the viewer's gaze point data against one or more relative movements of the graphical controls. As a result, the matching module may determine that a relative movement of a graphical control matches (in terms of one or more motion properties) the relative gaze movement derived from the viewer's gaze point data which has been provided (recorded) in the bidirectional mode. Optionally, the matching module may the indicate this fact to the operating system or an application executing thereon. In particular, if the matching module has access to (or knowledge of) instructions corresponding to the predefined input operations, then it may send an instruction associated with the matching input operation to the operating system or directly to an application executing on the operating system.

Preferably, the matching module is configured to accept only such matches between the relative movement that persist for at least a predetermined duration (match time); shorter match episodes may be disregarded as inadvertent or as being due to accuracy problems.

According to an aspect of the invention, the personal computer system further comprises a selector for triggering a transition into the bidirectional interaction mode. The viewer of the visual display (who may alternatively be referred to as a user of the personal computer system) may or may not have the option of controlling the selector by gaze. The viewer may also be able to control the selector by at least one other interaction modality than gaze. It is preferred that the selector is controlled only by interaction modalities other than gaze. The personal computer system may be programmed in such manner that the GUI transitions from the unidirectional into the bidirectional interaction mode in response to a signal from said selector, wherein the transition may comprise at least the following steps: determining a current gaze point based on gaze point data; and entering the bidirectional interaction mode, wherein graphical controls in motion are present at least in a neighbourhood of the current gaze point. For example, graphical controls may appear in this area when the bidirectional interaction mode is entered. In this connection, the gaze point data may be supplied by the gaze tracking system or other sources.

It is advantageous to limit the transition time elapsing from receipt of the signal from the selector until the bidirectional mode has been entered and graphical controls in motion are visible; the personal computer system may become less agreeable to use if this transition time is experienced as lengthy; the transition time does preferably not exceed one second, and more preferably it is less than 500 ms.

As used herein, a neighbourhood of the gaze point may be a region of the display image which surrounds, is adjacent or proximate to the current gaze point and having polygonal, circular, point-like, elongated, convex or concave shape or any other suitable shape, and being of any suitable size. A region of the display image may be defined as a collection of pixels, which is preferably constant between consecutive image frames. Preferably, the neighbourhood is a connected set substantially centred on the current gaze point (unless this is located near an edge of the visual display screen) and having a shape corresponding to the human field of vision (which may be modelled, e.g., as horizontally oriented oval). Alternatively, the neighbourhood may be a square or a circle, preferably with a diameter less than about half the width or height of the visual display screen, preferably less than about 40% of either of these dimensions, such as less than about 30%, such as less than about 20%. The neighbourhood in which graphical controls in motion are present in the bidirectional interaction mode may be stationary throughout a given episode in the bidirectional interaction mode, or may be updated at one or more later points in time during the same episode based on the then current gaze point location.

The invention achieves at least one of its objects, because the viewer (user) may conveniently activate the graphical controls in motion (i.e., enter the bidirectional interaction mode) in accordance with his or her needs for inputting data to the personal computer system. The action to enter the bidirectional interaction mode may be implemented without any activation delays (or gaze dwell time thresholds), so that, with practice, the user may interact with the system in a fast and efficient manner.

Further, because the graphical controls in motion appear in a neighbourhood of the point where the viewer is currently looking, the GUI will provide immediate feedback and is likely to maintain the viewer's attention after (s)he has activated the selector, thereby increasing the likelihood that (s)he will also submit an input by gazing at one of the graphical controls in motion.

Finally, because the invention proposes a personal computer system operable to execute an efficient gaze-controlled GUI while using hardware components that may not be optimized for accuracy, the invention provides for a potential reduction of costs. It is moreover possible to obtain highly accurate user input even though the gaze-controlled GUI is being shown on a visual display of moderate size; hence, the method provides an advantageous way of managing a limited screen area.

In one example embodiment, the neighbourhood of the current gaze point is substantially smaller than the entire screen (e.g., with a diameter less than about half the width or height of the visual display screen, as discussed above) and the graphical controls in motion appear only in this neighbourhood. This preserves a peaceful and inviting appearance of the display screen. Because the region outside said neighbourhood will not contain graphical controls in motion, the viewer's gaze is led to focus on the intended area.

In one example embodiment, there are two or more graphical controls in motion in the bidirectional interaction mode. Different graphical controls are associated with different predefined input operations to the operating system or an application executing thereon. By offering a variety of different selectable input operations, the user is able to enter a complex input sequence to the personal computer system in a reduced number of steps.

In one example embodiment, a timeout counter ensures that inadvertent user manipulations causing entry into the bidirectional interaction mode can be reversed, namely by having the graphics module leave this mode after a predetermined period of time in the absence of input actions (i.e., detected matches) via said graphical controls in motion. As such, the user is not required to submit an instruction such as "undo", "cancel" "revert", "dismiss", but may simply wait for the display screen to return to the unidirectional interaction mode. Such lack of response due to lack of interest in the input options offered by the bidirectional interaction mode may be completely natural or spontaneous to many users, including persons who have not studied a user's manual for the specific gaze-controlled GUI. Hence, a system according to this example embodiment may require a shortened learning period. An application program which is controllable via the GUI may offer a multi-stage functionality, e.g., a first operation followed by a selectable second operation. The application may choose to interpret the entry into the bidirectional interaction mode as an instruction to perform the first operation and then await a further instruction relating to the second, selectable operation. The application may benefit from cooperating with this embodiment of the invention in that it may react to expiry of the timeout counter (or equivalently, to a return to the unidirectional interaction mode triggered by such expiry) by cancelling the first operation, i.e., by executing an "undo" instruction. This restores the application to the state it was in before the GUI received the first user input, which caused it to enter the bidirectional interaction mode.

As a further development of the preceding example embodiment, each input action causes the timeout counter to restart, so that the GUI will leave the bidirectional interaction mode if the user stops interacting with the system.

There are at least two options for implementing the unidirectional interaction mode. One is to completely hide (or disappear) those graphical controls which are in motion in the bidirectional interaction mode; this is space-saving since useful information hidden beneath the graphical controls will be unveiled when they are removed. Another option is to show stationary equivalents of the graphical controls which are in motion on the bidirectional interaction mode. For instance, the same icon (graphical control) which follows a trajectory in the bidirectional interaction mode may sit in a constant location in the unidirectional interaction mode. Alternatively, a stationary element that is visually similar to the moving graphical control may be shown. Stationary equivalents may be particularly useful in a learning phase, while the user familiarizing himself or herself with the graphical user interface. Alternatively or additionally, an icon (graphical control) may have different appearances in the two interaction modes, e.g., differing by an added animation effect or a speed-related deformation (e.g., shapes suggesting movement) in the bidirectional interaction mode only.

There are several options for bringing about the desirable motion of the graphical controls. As one example, one or more graphical controls may follow a motion trajectory while the background component of the display screen remains stationary. The background component may be the complement of the graphical controls. The trajectory may in itself be predetermined, customized (by scaling, repositioning or the like), random, or dynamically variable in accordance with system parameters, user input, gaze point movements and the like. For instance, the trajectory may follow the current gaze point or suggest a movement following the current gaze point.

As another example, the image formed by the graphical controls and the background may jointly undergo a transformation, wherein the properties of the transformation vary over time to simulate a movement. With this setup, while the graphical controls may be perceived as moving together with the background of the screen image, the graphical controls will be in motion in relation to the coordinate system defined by the pixel coordinates. In a typical use case, where the visual display is a physical component substantially stationary with respect to the user, (s)he will be required to move the gaze point in order to keep focusing on the selected graphical component, so that a matching of the relative movement of the graphical control and a relative gaze movement is possible. The transformation may be a time-variable surface deformation, e.g., a zoom with respect to a centre inside or outside the neighbourhood of the gaze point, a pixel warp, a shear deformation, a squeeze deformation or the like. It is an advantage if the transformation chosen is such that reasonably spaced graphical controls differ between one another with respect to at least one motion property (see below), so as to facilitate unique matching of the relative gaze movement. Furthermore, the time variation may be expressed as time variations in parameters controlling quantitative properties of the image transformation in the neighbourhood of the gaze point. Such parameters include an amount of zoom, a factor by which dimensions of objects are to be compressed or stretched along in a certain direction, a shear factor, a squeeze factor etc. In particular, the illusion of movement may be perceived as more realistic if said parameters of the transformation vary continuously over time. In a discrete implementation with a finite display update rate, this translates into a quasi-continuity condition placing an upper bound on the maximal amount by which a property of the transformation may change between consecutive image frames.

In an example embodiment, a plurality of graphical controls in motion are displayed in the bidirectional interaction mode of the gaze-controlled GUI. The graphical controls may collectively move according to an outward or inward zoom movement, as this will typically allow a graphical control to be uniquely identified by its momentary motion vector. The zoom movement may relate to a general up- or downscaling of the graphical controls together with their arrangement in the plane of the display. Alternatively, the zoom movement may concern the locations of the graphical controls but not the graphical controls themselves. For each of these options, the background of the display image may or may not be subject to the zoom movement. For each of these options, the zoom movement may be defined by a zoom centre, which may be located within the displayable area of the visual display or outside of this. If the zoom movement affects the locations only, the graphical controls may be seen as moving along respective rays extending from the zoom centre.

In one example embodiment, the gaze tracking system is adapted to supply gaze point data including a current gaze point of the viewer. In addition to the matching module, the gaze tracking system may supply gaze point data to the operating system of the personal computer system or an application executing thereon. The gaze tracking system is adapted to derive the gaze point data by means of a configurable mapping having as input eye image data (e.g., recorded by one or more image sensors or cameras) or pre-processed eye image data. The pre-processing may include feature extraction from one or more images showing an eye or portion of an eye of the viewer. In particular, quantitative properties of the configurable mapping may be adjusted by varying associated parameters. This configurability may be used for calibrating the mapping so that the gaze data, particularly the gaze point, thus supplied corresponds more faithfully to the viewer's own understanding of where (s)he is currently looking; generally this understanding is a function of the viewer's eye and head geometry, and possibly also individual variations in the mental processes associated with the visual perception. In prior art systems, the information underlying a calibration may typically be obtained by having the user fixate a graphical test object, which is typically stationary, and compute the deviation between the experienced and the actual gaze point. In the present example embodiment, however, the matching module will assume that the gaze point of the viewer agrees with the location of a graphical control in motion for the duration of a detected match between the relative motion of the graphical control and the relative gaze motion of the viewer. The configurable mapping is calibrated by adjusting it in such manner that simultaneous viewer gaze point values become equal (or closer in a least-squares sense or the like, see below) to a location of a matching graphical control in motion; put differently, the graphical control in motion is equated to a time-simultaneous value of the gaze point. In embodiments where stationary equivalents of the graphical controls are displayed in the unidirectional interaction mode, situations may frequently arise where the user's gaze point is constant over a period beginning when the system enters the unidirectional interaction mode or where the user returns to or near the gaze point (s)he had when the bidirectional interaction mode ended; it is then reasonable to assume that the user experiences (s)he is gazing at the stationary equivalent replacing the graphical control in motion that (s)he was following in the just finished bidirectional interaction mode.

In such situations, the configurable mapping may be adjusted with the aim that the constant gaze point value becomes equal or closer to the location of the stationary equivalent. The adjusting may be subject to the condition that the gaze point of the viewer is substantially equal to its value at entry into the unidirectional interaction mode. In one implementation, the location of the graphical control (in one or more points in the path of the graphical control) may be used for an immediate calibration of the quantitative parameters associated with the configurable mapping. Alternatively, one or more calibration points (each comprising a gaze point value and a simultaneous location of a graphical control, to be used as the true gaze point) may be stored or buffered for later use in a calibration where a plurality of points are considered jointly. The calibration may be performed after the system has entered the unidirectional interaction mode again or, alternatively, during a brief interruption (a "freeze" of the order of a few milliseconds or tens of milliseconds, unnoticeable to the user) inside an episode of the bidirectional mode. The points may be stored in a memory in the gaze tracking system or in the matching module or a memory controlled by the operating system. Hence, because the calibration can be delayed until the system has entered the unidirectional interaction mode or later, the actual equating step is not necessarily performed while the graphical control is in motion; however, it is preferably based on data collected during an episode when the graphical control was in motion. The calibration operation in itself may be carried out by the gaze tracking system; alternatively, it may be performed in a distributed fashion, e.g., the matching module computes the necessary adjustments to the parameters, which are provided to the gaze tracking system, which executes them. A calibration based on a plurality of points may be based on collective minimization (e.g., in a least-squares sense or by outlier-removal or other filtering) of the total deviation between the actual gaze points and the gaze points according to the configurable mapping with actual values of its parameters. The location of a graphical control may be specified as the location of its geometric centre or the location of its visual centre (e.g., the location of a prominent feature, such as a bright coloured area). It is understood that the current gaze point supplied by the gaze tracking system can be used as input to an application executing on the operating system; such input becomes all the more reliable with appropriate calibration. An advantage of the present example embodiment is that it does not require dedicated calibration time. A further advantage is that the calibration takes place without influence from subjective judgment on the part of the user.

In one example embodiment, the matching module derives quality data by measuring a deviation between a gaze point computed by the gaze tracking system and an exact gaze point, wherein the exact gaze point is to be understood as the location of a graphical control in motion for the duration of a detected match between the relative motion of the graphical control and the relative gaze motion of the viewer. As in the preceding example embodiment, the gaze tracking system is adapted to supply a current gaze point (e.g., to the matching module or the operating system of the personal computer system), possibly based on eye image data or pre-processed eye image data. Again, the respective locations of the current gaze point (supplied by the gaze tracking system) and the graphical control (supplied by the graphics module) matching the gaze points are sampled from the paths along which these two objects are moving (or were moving, if the data is stored or cached) in the bidirectional interaction mode for the duration of a detected match; for example, the matching module may extract one or more snapshots from the respective paths and store these for later processing. From this data, it is possible to derive a quality index on the basis of a maximal deviation, a mean deviation, a mean square deviation over the duration of the match, or some other suitable statistical measure. The matching module outputs the quality index for use by the operating system, in particular by applications executing thereon. Alternatively, the quality index is computed by the operating system or an application executing on the operating system on the basis of the gaze tracking data, provided to it by the gaze tracking system, and the location of the graphical controls, as communicated by the graphics module. As noted in connection with the preceding embodiment, the index may be computed immediately, i.e., during or briefly after the detected match, or in a delayed manner, by relying on stored or cached data indicating the respective locations of the graphical control in motion and the gaze point of the viewer.

A particular use of this quality index may be to tune the graphical user interface, so that it is adapted to current visibility and accuracy conditions. As one example, the quality index may determine the fixed zoom factor to be used in a zoom operation controlled by a pointer click or pointer single-click or an equivalent gaze-based input operation. One implementation option is to use a relatively higher zoom factor if the quality index is low, as this may indicate that the poor gaze accuracy limits the user's ability to select a graphical control object. As a further example, the size of the graphical controls may be adjusted in accordance with the quality index. For instance, a relatively lower quality index value may trigger a relatively greater size of the graphical controls on the visual display; this may apply in the bidirectional and/or the unidirectional interaction mode. As a still further option, the system may provide a relatively larger neighbourhood of the current gaze point, in which graphical controls in motion are present, in response to a calibration quality index value indicating a relatively larger deviation, and vice versa.

In one example embodiment, the matching of the relative movements of the graphical controls and the relative gaze movement is based on agreement between one or more motion properties. As used herein, a motion property refers to any quantitative property that can be derived from the gaze point data as a function of time and is suitable for matching in the way described. Examples include momentary values of speed, acceleration, direction, tangent vector, curvature and normal vector; and time-averaged values of the same quantities; and minimal values of the same quantities; and maximal values of the same quantities. Motion properties may be understood to exclude position.

Examples of non-gaze modalities, by which the viewer (user) may interact with the selector for triggering a transition into the bidirectional interaction mode, include voice (which may be sensed by acoustic transducers), body gestures (which may be sensed by optical transducers, in particular a camera that serves the double purpose of tracking eye movements and detecting body gestures), body proximity (which may be sensed by an optical sensor or a capacitive sensor) and touch activation (which may be sensed by a mechanical actuator or an optical or capacitive touch sensor).

In a further development of the personal computer system outlined above, the selector may further trigger a transition into the unidirectional interaction mode. For instance, the user may change his or her mind and refrain from making any input to the gaze-controlled GUI. If the GUI is operable in the bidirectional and unidirectional interaction modes only, the selector may respond to a single command for toggling between the two modes. Alternatively, the selector may accept two different input types, such as depression of a touch actuator (e.g., to enter the bidirectional interaction mode) and release of the same touch actuator (e.g., to enter the unidirectional interaction mode).

Further aspects of the invention provide a method and a computer program product for controlling an operating system or an application of a personal computer system associated with a visual display. The method includes the steps performed by the personal computer system described above.

Summarizing the discussions in this section, the various aspects of the invention are based on an insight that the gaze modality and other input modalities can be purposefully combined into attractive and powerful human-machine interfaces.

It is noted that the invention relates to all combination of features, even if these are recited in mutually different claims.

BRIEF DESCRIPTION OF THE DRAWINGS

Example embodiment of the invention will now be described in more detailed with reference to the accompanying drawings, on which.

All the figures are schematic and generally only show parts which are necessary in order to elucidate the invention, whereas other parts may be omitted or merely suggested. Unless otherwise indicated, like reference numerals refer to like parts in different figures.

DETAILED DESCRIPTION OF EMBODIMENTS

Figure 1:
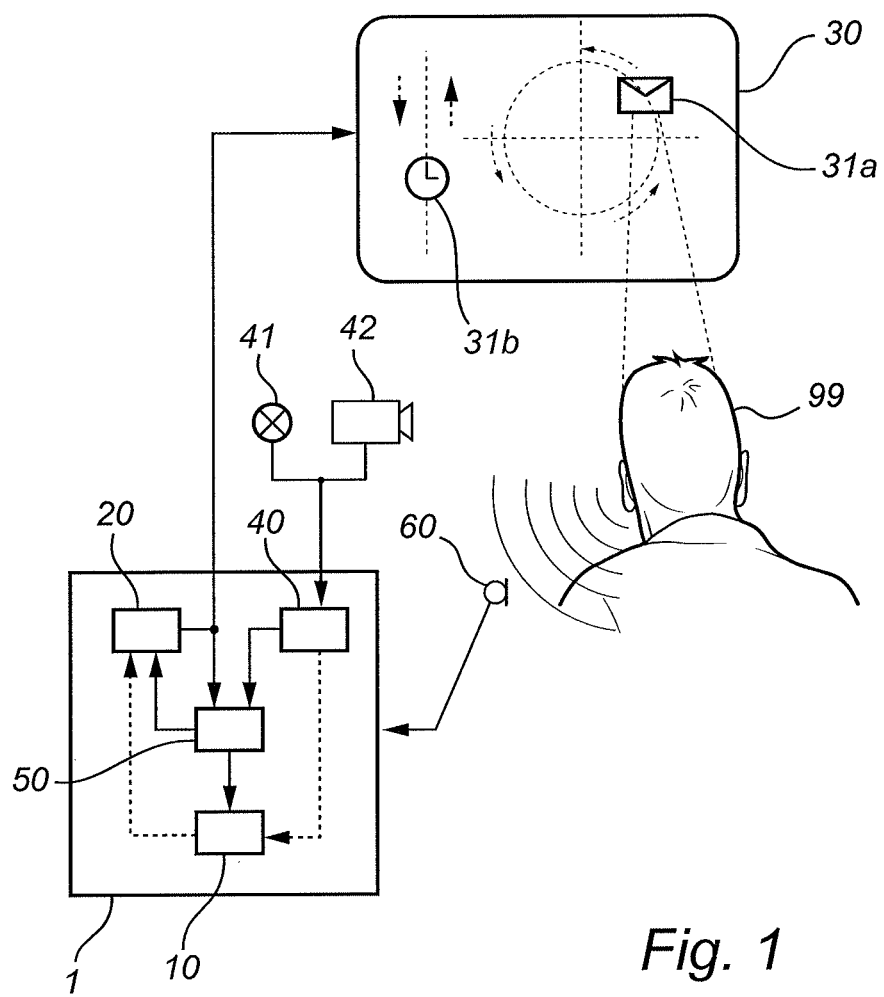
FIG. 1 shows a gaze-controlled personal computer system according to an embodiment of the invention and a user interacting with the system.

FIG. 1 is a generalized block diagram of a personal computer system 1 associated with a visual display 30 and operated by a user 99 by means of gaze and at least one further interaction modality. The personal computer system 1 comprises an operating system 10 allowing applications to execute. For instance, the operating system 10 may include a kernel (not shown) for executing program code; in particular, the operating system 10 may provide a runtime environment (execution environment) adapted to execute computer-readable code in accordance with one or more predefined programming languages. Program code providing a gaze-controlled GUI executes on the operating system 10. The personal computer system 1 further comprises a graphics module 20 for providing a display signal to the visual display 30 and a gaze tracking system 40 for providing gaze information about the user 99. By way of example and not limitation, FIG. 1 includes symbolic indications of one-way and two-way communicative connections between the components within the personal computer system 1. Some of the connections, which have been indicated by dashed line, have an optional character and are only relevant in particular example embodiments. Further alternatively, the system 1 may be embodied with an even higher degree of connectivity between the components, such as by connecting all components to a common data bus (not shown).

For this purpose, the gaze tracking system 40 comprises at least one sensor 42 with a light-sensitive surface arranged to receive light (which is reflected) from the head of the viewer 99 of the visual display 30. The light may be provided by a light source 41 controllable by the gaze tracking system 40. The at least one sensor 42 may be a proper part of the gaze tracking system or may be external to the system, e.g., may be provided as a peripheral component (not shown). Other components of the gaze tracking system 40 can be distributed between the computer system 1 and one or more peripherals thereof with the same flexibility. The distributed components may be both imaging components and processing components, e.g., an image pre-processor (adapted to perform feature extraction and/or pattern recognition) and a processor responsible for executing the configurable mapping discussed above. The sensor 42 may be a single sensor or two sub-sensors of different types or same type. The sensor 42 may be sensitive to visible light, to near-infrared or infrared light. Further possible configurations of the sensor 42 and the light source 41 include the following:

a) The sensor 42 comprises two high-resolution CMOS-type sensors, the outputs of which are processed by triangulation to yield a depth map. Alternatively, the processing may be simplified in that the two outputs are processed to yield a distance to an eye or a partial depth map restricted mainly to the eye region. The light source 41 may be used during eye imaging, e.g., providing general illumination or a corneal reflection. The light source 41 may alternatively be used to shorten the exposure time.

b) The sensor 42 comprises a first imaging device being a higher-resolution CMOS-type sensor, and a second imaging device being a lower-resolution CMOS-type sensor. The first imaging device provides eye imagery. A depth map is created by operating the second imaging device while simultaneously illuminating the viewer's 99 head by structured or coded light from the light source 41.

c) The sensor 42 comprises a first imaging device being a higher-resolution CMOS-type sensor, and a second imaging device being a time-of-flight sensor. In an implementation of this type, the light source 41 is preferably modulated and synchronized with the time-of-flight sensor.

The personal computer system 1 further comprises a selector 60 and a matching module 50 receiving data from the graphics module 20 and the gaze tracking system 40. The selector 60, which is here illustrated as an acoustic sensor by way of example, is operable by at least one interaction modality other than gaze (see above). The graphics module 20 accepts an input signal from the selector 60 and reacts by transitioning between the unidirectional and the bidirectional interaction modes of the GUI, as explained above. In the bidirectional interaction mode of the GUI, the graphics module 20 causes the visual display 30 to show graphical controls 31a, 31b (icons) in motion, at least in a neighbourhood of a current gaze point determined by the gaze tracking system 40. In the example illustrated by FIG. 1, a first graphical control 31a can be moved along a circular path, and a second graphical control 31b can be moved along a linear path. In the bidirectional interaction mode, either or both of these graphical controls 31a, 31b are in motion along their respective paths. Advantageously, the first graphical control 31a, which is located at or near a current gaze point of the viewer 99, is in motion, whereas the second graphical control 31b, which is not in a neighbourhood of the current gaze point, is stationary, replaced by a stationary equivalent or not shown at all.

In operation, the matching module 50 searches for a match between a relative gaze movement derived from gaze point data supplied to it by the gaze tracking system 40 and a relative movement of any of the graphical controls 31a, 31b, of which it is informed by the graphics module 20. If a match is detected, the matching module 50 reports this to the operating system 10. Preferably, the matching module 50 or the operating system 10 or an application executing thereon is configured to derive an input operation which is associated with that graphical control 31a, 31b for which the match is detected.

FIG. 2 illustrates zoom movements which may be used in the bidirectional interaction mode of the GUI. Each of sub-FIGS. 2A, 2B, 2C, and 2D shows a region of the visual display 30 corresponding to a neighbourhood of the current gaze point, that is, a region in which graphical controls 231 in motion are shown. In these sub-figures, there is indicated an origin O of a reference coordinate system which is stationary with respect to the display 30. A point denoted by C illustrates a zoom centre, towards which the graphical controls 231 converge over time. Sub-FIG. 2A shows the three graphical controls 231 in their respective initial positions, which are common to all four sub-FIGS. 2A, 2B, 2C, 2D.

Figure 2A:
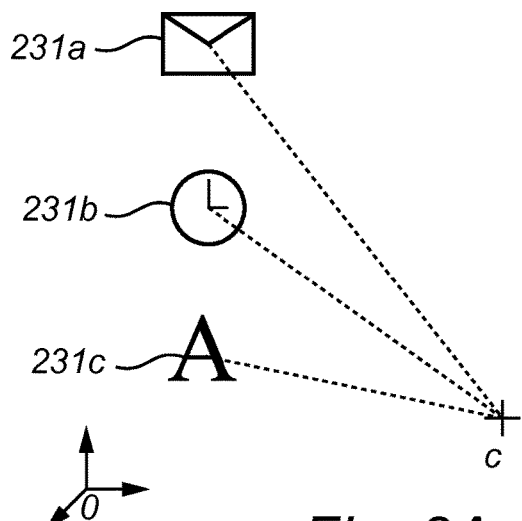
FIGS. 2A, 2B, 2C, and 2D illustrate different motion patterns of graphical controls, for use with embodiments of the invention.
Figure 2B:
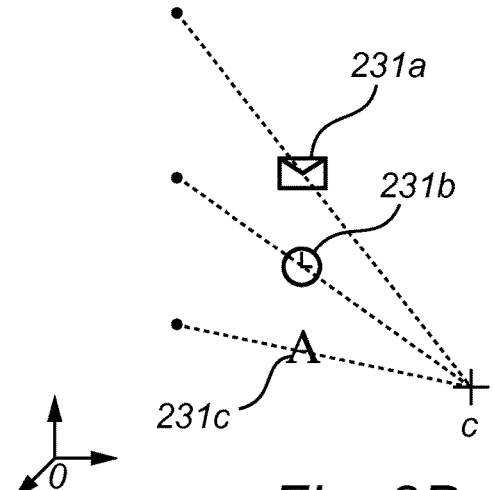
Figure 2C:
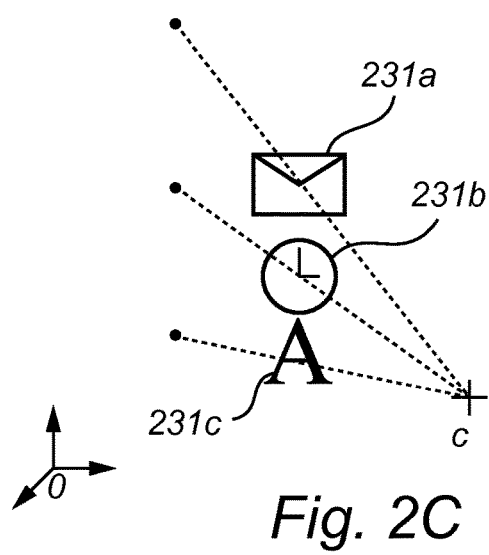

Sub-FIGS. 2B and 2C differ by the nature of the zoom movement. In FIG. 2B, the length scale of the graphical controls decreases in linear proportion to the decrease of the length scale of their mutual distances. It may be said that the arrangement of the icons is zoomed together with the icons themselves. In other words, the image of the three graphical controls 231 is zoomed (out) as a whole. Said image may refer to a foreground plane, including the graphical controls 231 only, or may further include a background plane, whereby the graphical controls 231 are downscaled together with those portions of the background which are visible around the controls 231. In FIG. 2C, however, the graphical controls 231 are not affected by a scale change. Instead, the zoom movement amounts to a simultaneous linear movement of the graphical controls 231 along paths extending from the respective original locations to the common zoom centre C. One may say that the arrangement is zoomed (out) but not the graphical controls 231 themselves.

Figure 2D:
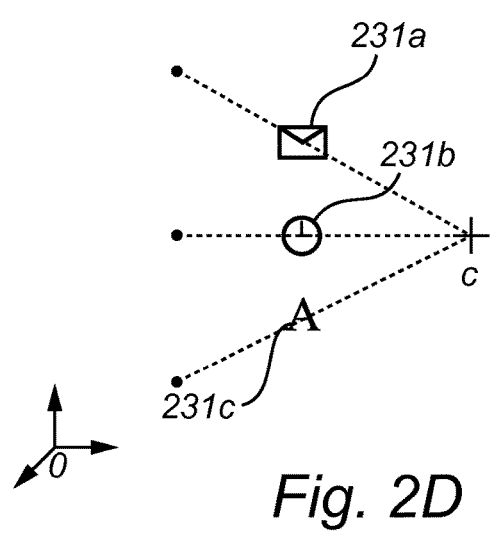

Sub-FIGS. 2B and 2D differ by the location of the zoom centre C. The rescaling of each graphical control 231 is unaffected by the difference in zoom centre location or almost so (e.g., an elongated graphical control may undergo a non-homogeneous scale change over its length), whereas their respective directions of motion may change considerably. In the case shown in sub-FIGS. 2B and 2D, all three graphical controls 231 will have a different direction of relative motion as a result of the change in zoom centre location.

Figure 3A:
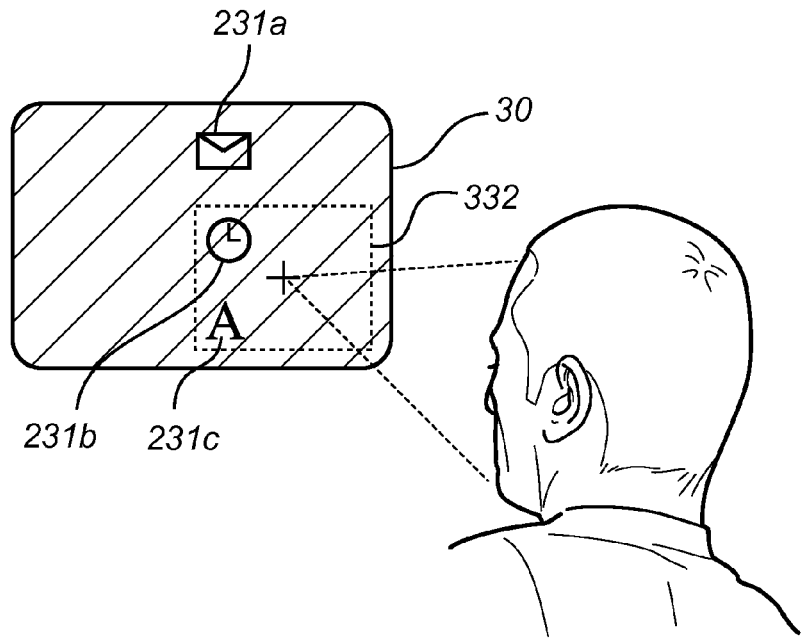
FIGS. 3A, 3B, and 3C illustrate different motion patterns of graphical controls, for use with embodiments of the invention.

FIG. 3 shows two further zoom movement to be used with embodiments of the present invention. According to both zoom movements, those graphical controls 231b, 231c which are located in a neighbourhood 332 of a current gaze point (indicated by '+' sign) are zoomed in or zoomed out together with the background visible around or through the graphical controls. Those graphical controls 231*a* which are outside said neighbourhood 332 are not affected by the zoom movement. Sub-FIG. 3A is an exemplary view of a GUI when in a unidirectional interaction mode. In the example shown, the neighbourhood 332 is a limited sub-area of the visual display 30.

Figure 3B:
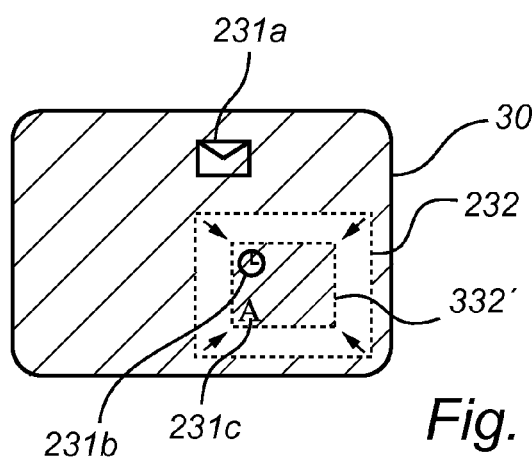

In accordance with a first (zoom-out) embodiment, sub-FIG. 3B shows the GUI in the bidirectional interaction mode. The neighbourhood 332 of the gaze point is being successively shrunk over time into gradually smaller regions 332' having a corresponding shape. This causes the two graphical controls 231*b*, 231*c* to move in mutually different directions, each defining a relative motion that is distinguishable from the other. It has been explained in previous sections of this disclosure that the matching module 50 will attempt to match the viewer's 99 relative gaze movement to a unique one of the relative movements of the graphical controls 231*b*, 231*c*. The space between the original location of the neighbourhood 332 and the associated shrunk version 332' may be filled with a neutral colour, a background pattern, a stretched version of an edge of the neighbourhood 332 or the like; this is not essential to the invention.

In a further development of the first (zoom-out) embodiment, the system responds to a detected match by continuing the zoom-out movement of the neighbourhood 332'. The zoom-out movement may continue at the same speed or a higher speed. For example, an accelerated zoom movement could act as a confirmation from the system 1 to the viewer 99 that an input operation (e.g., a selection) has been accepted. Either way, the neighbourhood 332' will occupy a small fraction of the visual display 30 (e.g., a couple of tens or hundreds of pixels), whereby it will be perceived as a point-shaped visual feature. Because a point-shaped object has negligible spatial extent, the actual gaze point of the viewer 99 will be known with high accuracy, making this an advantageous opportunity for recording calibration data (calibration points). As discussed in detail above, the calibration input may operate with the purpose of minimizing any deviation between a gaze-point determination by said configurable mapping and the actual location of the shrunk neighbourhood 332; this is likely to improve the accuracy of the gaze tracking system 40. In a variation to this further development, the neighbourhood 332 is replaced by the full area of the visual display 30. The area may shrink to a point (or small area) at the centre of the visual display 30 or located eccentrically. Preferably, the displayed content is shrunk towards a point chosen in accordance with a current gaze point location of the viewer 99 to reduce any visual discomfort.

Figure 3C:
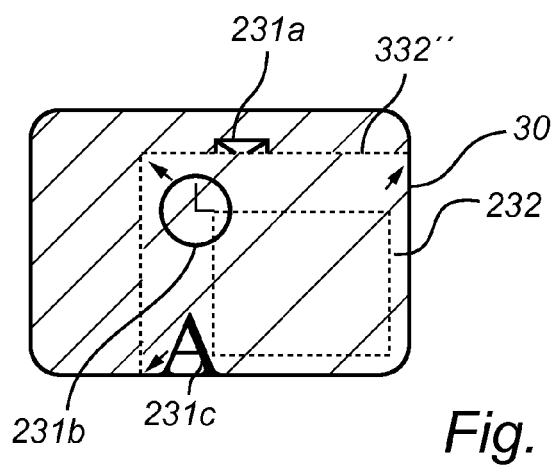

Sub-FIG. 3C shows a second (zoom-in) embodiment, wherein the neighbourhood 332 of the current gaze point undergoes a positive scale change, so that it occupies a gradually larger portion of the visual display 30. This zoom-in movement is equally efficient as the zoom-out movement in order to assign unique directions of relative motion of the graphical controls 231*b*, 231*c*. The second embodiment does not create an intermediate area (such as between the regions 332 and 332' in FIG. 3B), and so there is no need to decide on what (visually neutral) content is to fill this area. Instead, the neighbourhood 332" thus expanded may cover other elements of the GUI, e.g., a graphical control 231*a* located outside the neighbourhood 332. It is pointed out that the graphical controls 231*b*, 231*c* undergo a scale change together with the background in the second embodiment as well.

Figure 4:
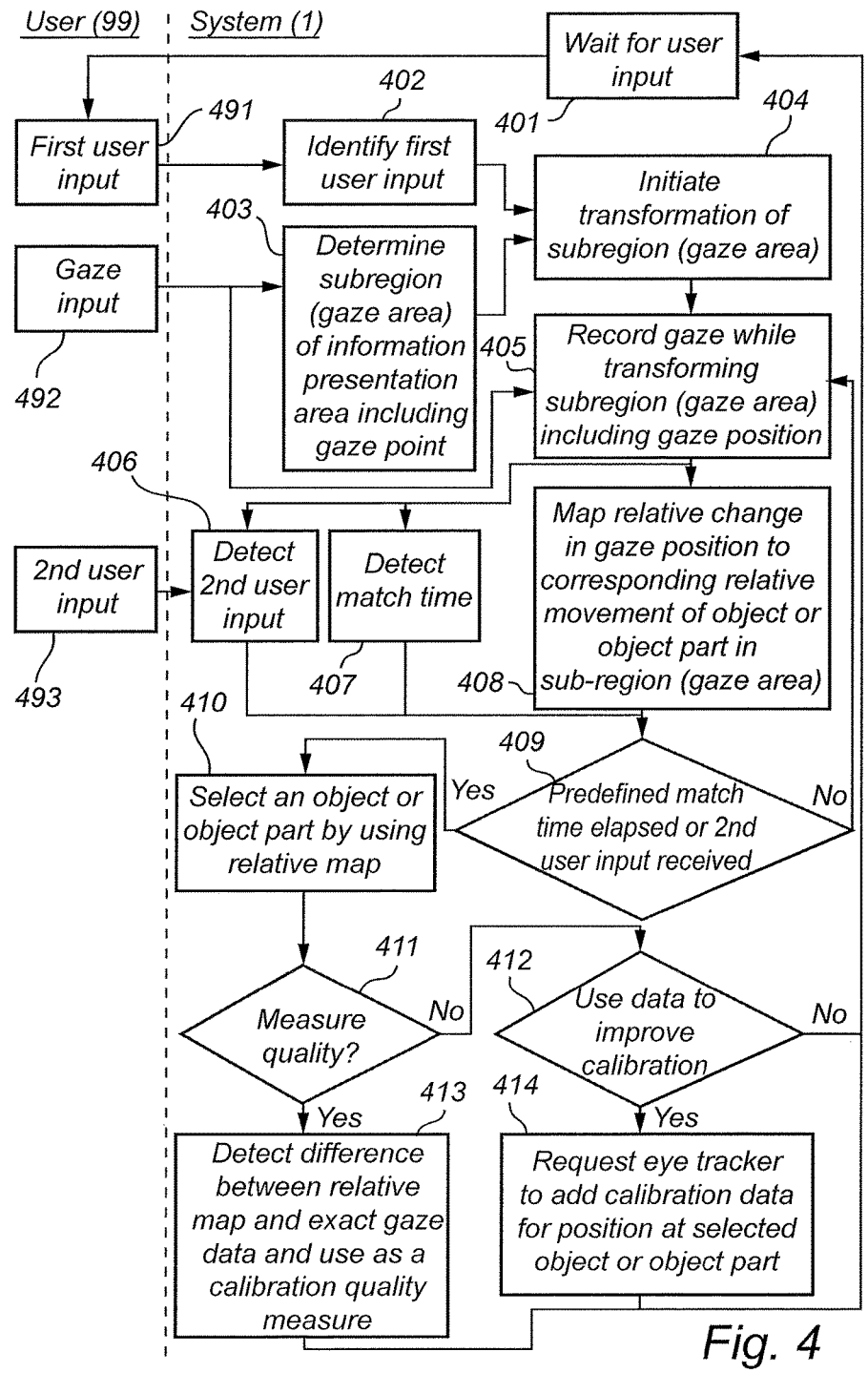
FIG. 4 is a flowchart showing a method of operating a personal computer system providing the gaze-controlled GUI according to the invention.

FIG. 4 is a flowchart of a method for operating a personal computer system 1 providing the gaze-controlled GUI according to the invention. The method may be embodied as computer-executable code and may execute on the operating system 10 of the personal computer system 1. Alternatively, such program code is executed by internal logic in a peripheral eye-tracking component.

The flow chart contains the activities, events and decision points listed in Table 1.

TABLE 1

Flowchart in FIG. 4

Input from user 99

491 First user input is received by system
492 Gaze-based user input is received by system
493 Second user input is received by system Activities by system 1

401 Wait for user input
402 Identify first user input
403 Determine sub-region of information presentation area including gaze point (neighbourhood of current gaze point)
404 Initiate non-linear transformation of sub-region
405 Record gaze while transforming the sub-region including gaze position
406 Detect the second user input
407 Measure match time, during which a relative gaze movement matches a relative movement of a graphical control.
408 Map relative change in gaze position (relative gaze movement) to corresponding relative movement of graphical control or portion of graphical control within sub-region
410 Select a graphical control or portion thereof, for which a match has been determined, selected.
413 Detect difference or average difference between relative map and exact gaze data and use as a calibration quality measure
414 Request gaze tracking system to store exact gaze data (calibration point(s)) for selected graphical control for later use in calibration Decision points by system 1

409 Is the measured match time long enough to count as an advertent input operation?
411 Is a quality index computation requested?
412 Is calibration data requested?

The method is of a loop type and may be running at all times when the gaze-controlled GUI is active. Activity 401 may be a waiting state of the system 1, which it leaves when a first (non-gaze) input is received 491 from the user 99. The gaze input 492 may be effected by the system 1 in response to the first user input—that is, without the user's 99 intervention—by reading out a gaze point from the gaze tracking system 40. After the GUI has entered the bidirectional interaction mode in step 404, the gaze tracking system 40 monitors a current gaze position of the user 99 and forwards this to the matching module 50 which endeavours to match the relative gaze movement against the known relative movement of any of the graphical controls in motion. The matching module 50 is configured with a predetermined match time, which is the least duration for which an agreement between the relative gaze movement and the relative movement of the concerned graphical control must last to count as a positive match. Because the graphical controls are associated with predefined input operations, a match may be interpreted as an input to the operating system or an application. As long as no match has been determined, the gaze recording 405 as well as the matching module's 50 attempts to map the respective relative movements 406 will continue. An alternative way by which the user 99 may trigger a match—in order to select a graphical control in motion—is to submit a second (non-gaze) input 493 while fixating the graphical control. The second user input 493 may be submitted using the selector 60 previously referred to; if a mechanical selector 60 is provided then a depression of the selector 60 may constitute the first input and a release may constitute the second input. If a match has been determined the graphical control (object) is considered selected 410. The GUI then leaves the bidirectional interaction mode (and optionally, it enters the unidirectional interaction mode). In connection with this, the system 1 may choose to record calibration data 414 or to compute a quality index 413.

The determination of a match may proceed according to different principles. As a first example, a match is defined as a match time (during which the user follows a given one of the moving graphical controls) above a predetermined threshold. As an alternative, a second user input 493 submitted while a graphical object is followed is interpreted as a match, whereas a second user input 493 submitted at a point in time where the user does not follow any graphical object may be interpreted as an "abort" command. Such abort command may trigger a transition back to unidirectional mode.

It is noted that an implementation of the operating method shown in FIG. 4 may further include a timeout functionality which limits the time spent in the bidirectional interaction mode without performing any (or any new) selection of a graphical object. In the flow chart, this may translate into replacing the "No" leg of decision point 409, which normally leads back to activities 405 and 406, by a change to activity 401, in which the system 1 awaits user input while operating in the unidirectional interaction mode.

Figure 5:
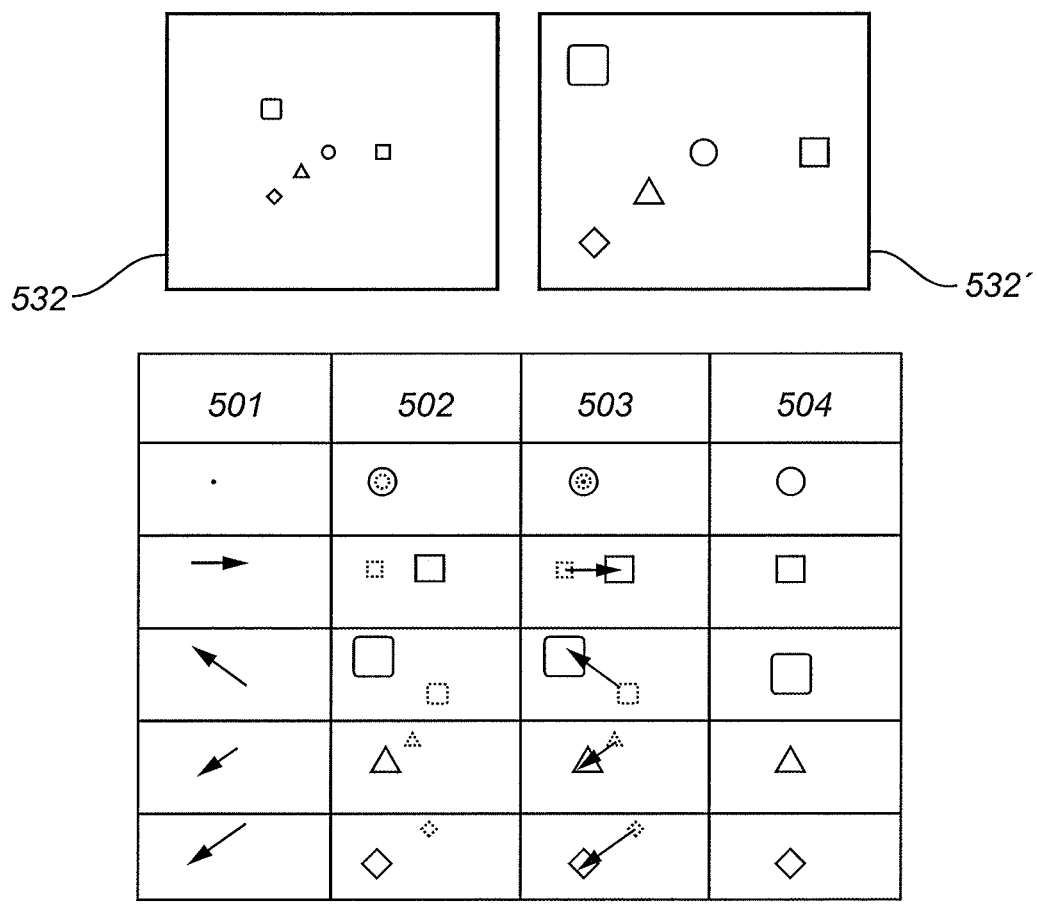
FIGS. 5 and 6 illustrate further motion patterns of graphical controls as well as matching information for finding a correspondence between a relative movement of a graphical control and a relative gaze movement.

FIG. 5 illustrates the matching of the relative gaze movement to relative movements of the graphical controls during a zoom-in movement. A region 532 of the visual display 30 contains five graphical controls, each being associated with an input operation to the operating system 10 of the personal computer system 1 or an application executing thereon. When the GUI enters the bidirectional interaction mode, a subarea of the visual display 30 which contains the current gaze point (i.e., it is a neighbourhood of the gaze point) is zoomed in to cover a gradually larger portion of the region, whose appearance 532' is shown at a later point in time in the right upper half of the figure. In the table in the lower portion of FIG. 5, a first column 501 shows momentary motion vectors for the five objects during the zoom-in movement. Because the circular graphical control coincides with the zoom centre, it is associated with a zero motion vector. A second column 502 shows the object before (dashed line) and after (solid line) the neighbourhood has undergone the transformation. A third column 503 shows a combination of the contents of the first and second columns 501, 502. Because all five motion vectors are distinguishable, either by their direction or modulus, they can be used to uniquely determine their associated graphical control, as a fourth column 504 of the table shows.

Figure 6:
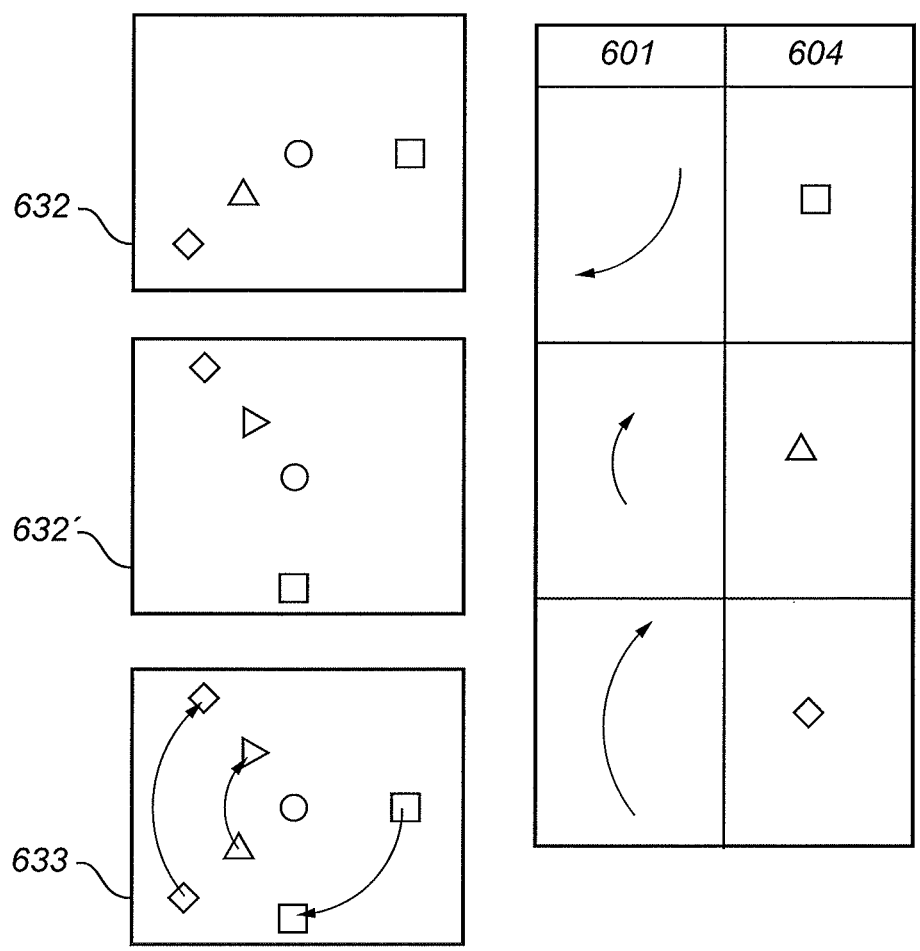

FIG. 6 illustrates a similar procedure, however in the case of a rotational movement by about −90° applied to four graphical controls in the GUI. Region 632 refers to the point in time at which the movement begins, and region 632' refers to the point at which the movement has completed. A third view 633 shows the four graphical controls both in their initial and final positions together with curved arrows illustrating the movements. Clearly, the circular object coincides with the centre of rotation. In the present example, as illustrated by the table in FIG. 6 (first column 601—motion path, second column 604—graphical control), the momentary motion vectors vary over time for all but the circular graphical control. The triangular and diamond-shaped graphical controls are located on the same ray from the centre of rotation and will therefore move in the same direction at every point in time. Because however they will move at different speeds at all times, the momentary motion vectors will remain distinguishable and can be matched uniquely to a relative gaze movement. The square-shaped graphical control is located on a separate ray than the other moving graphical controls—i.e., the triangular and the diamond-shaped graphical control—and will therefore have a unique direction of relative motion throughout the rotation.

In an advantageous embodiment, a personal computer system 1 for providing a gaze-controlled GUI comprises: an operating system 10 for executing an application; a graphics module 20 for generating a display signal to be supplied to a visual display 30, the graphics module being operable in: a bidirectional interaction mode, in which the visual display shows one or more graphical controls 31 in motion, each of said graphical controls being associated with at least one predefined input operation to the operating system or an application executing on the operating system; and a unidirectional interaction mode without said graphical controls in motion; and the PC system further comprises: a gaze tracking system 40 operable to provide gaze point data of a viewer 99 of the visual display; a matching module 50 operable to determine a match between a relative movement of any of said graphical controls and a relative gaze movement derived from said gaze point data in the bidirectional mode, and indicating the at least one predefined input operation associated therewith to the operating system or to the application executing thereon in response to a positive determination by the matching module, wherein the personal computer system further comprises a selector 60, which is controllable by the viewer by an interaction modality other than gaze, and the personal computer system is configured to: i) initiate a transition from the unidirectional interaction mode to the bidirectional interaction mode in response to an input received at the selector; ii) provide gaze point data using the gaze tracking system; iii) determine a current gaze point based on the gaze point data thus provided; and iv) enter the bidirectional interaction mode, wherein graphical controls in motion are present at least in a neighbourhood of the current gaze point.

In an advantageous embodiment, a method of controlling an operating system 11 in a personal computer system 10 associated with a visual display 30, comprises: displaying an image without graphical controls in motion; receiving a mode transition command from a viewer of the visual display by means of a human-machine interaction modality other than gaze; determining a current gaze point of the viewer based on gaze point data provided by a gaze tracking system 40; displaying an image including one or more graphical controls 31 in motion, each of said graphical controls being associated with at least one predefined input operation to the operating system or an application executing on the operating system; determining a match between a relative movement of any of said graphical controls and a relative gaze movement derived from gaze point data provided during said step of displaying; and in response to a positive determination of a match, indicating a predefined input operation associated with the graphical control to the operating system or to the application executing thereon, wherein said graphical components in motion are present at least in a neighbourhood of the current gaze point.

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description (in particular the operating system 10, graphics module 20, gaze tracking system 40 and matching module 50) does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A personal computer system providing a gaze-controlled graphical user interface, the personal computer system comprising:
   a gaze tracking system operable to provide gaze point data of a viewer of a visual display; and
   a processor configured to generate a display signal to be supplied to the visual display, the visual display associated with a reference coordinate system that is stationary with respect to the visual display;
   wherein the personal computer system is configured to:
      determine a gaze point on the visual display based on the gaze point data, the gaze point determined with respect to the reference coordinate system,
      operate in a bidirectional interaction mode, in which the visual display shows multiple graphical controls in motion with respect to the reference coordinate system, wherein each one of the multiple graphical controls in motion, when selected using gaze input, causes a respective predefined input operation to occur,
      operate in a unidirectional interaction mode, in which the visual display shows the multiple graphical controls in constant locations with respect to the reference coordinate system, when selected using a non-gaze input causes the respective predefined input operation to occur;
      transition from the unidirectional interaction mode to the bidirectional interaction mode, wherein the transition causes the multiple graphical controls to be in motion;
      in response to transitioning to the bidirectional interaction mode:
      present at least in a neighborhood of the gaze point a first graphical control in motion and a second graphical control in motion, wherein the neighborhood is substantially centered on the gaze point and is smaller than an entirety of the visual display,
      determine a first path including a first relative motion of the first graphical control and a second path including a second relative motion of the second graphical control, wherein the second relative motion is distinguishable from the first relative motion,
      determine a gaze motion based on relative movements of the gaze point,
      compare the gaze motion to each of the first path and the second path, and
      in response to determining a match between the gaze motion and either the first path or the second, indicate the respective predefined input operation associated with the matching one of the first graphical control or the second graphical control, and
      transition from the bidirectional interaction mode to the unidirectional interaction mode when one or more criteria are met, causing the multiple graphical controls to be in constant locations.

2. The system of claim 1, wherein the personal computer system is further configured to initiate a timeout counter to measure a current dwell time in the bidirectional interaction mode, and to initiate the transition from the bidirectional interaction mode to the unidirectional interaction mode when the match has not been determined before the dwell time exceeds a predefined threshold.

3. The system of claim 1, wherein the personal computer system causes the visual display to show a stationary equivalent of at least one of the graphical controls in the unidirectional interaction mode.

4. The system of claim 1, wherein the processor generates the display signal in the unidirectional interaction mode in which at least one of the graphical controls is absent.

5. The system of claim 1, wherein said neighborhood of the gaze point includes a plurality of graphical controls and undergoes a time-variable surface deformation.

6. The system of claim 1, wherein:
   the gaze tracking system provides the gaze point data by means of a configurable mapping having as input pre-processed eye image data; and
   in the bidirectional interaction mode, the gaze tracking system is operable to calibrate said configurable mapping by equating simultaneous values of the gaze point of the viewer and a location of the matching graphical control in motion.

7. The system of claim 6, wherein the calibrating is delayed until after transitioning to the unidirectional interaction mode.

8. The system of claim 1, wherein the personal computer system further comprises an operating system for executing an application, and wherein one of the eye gaze tracking system, the processor, the operating system, or an application executing on the operating system is operable to output a calibration quality index based on a deviation between simultaneous values of the gaze point of the viewer and the relative locations of the graphical controls in motion.

9. The system of claim 8, wherein the size of said neighborhood of the gaze point is variable in dependence of the calibration quality index, wherein a relatively larger neighborhood is provided in response to the calibration quality index indicating a relatively larger deviation.

10. The system of claim 1, wherein the match between the relative movements of the matching graphical control and the relative movements of the gaze point is determined based on a motion property which is one in the group comprising: speed, acceleration, direction, curvature.

11. The system of claim 1, wherein the personal computer system further comprises a selector, and is configured to initiate a transition from the unidirectional interaction mode to the bidirectional interaction mode in response to an input received by the selector; and wherein the input is a modality in the group comprising: voice, body gesture, body proximity, touch activation.

12. The system of claim 1, wherein the match between the relative movements of the matching graphical control and the relative movements of the gaze point is determined based on a motion property which is one in the group comprising: speed, acceleration, direction, curvature; and
wherein the graphical controls associated with different predefined input operations differ in respect to one or more of said motion properties.

13. The system of claim 1, wherein:
the first path is determined based on the relative movements of the first graphical control over time and the second path is determined based on the relative movements of the second graphical control over time;
the gaze motion is determined based on the relative movements of the gaze point over time; and
the match between the gaze motion and either the first path or the second is determined based on the relative movements of the first path or the relative movements of the second pathmatching the relative movements of gaze point for a duration of a match time.

14. A method of controlling an operating system in a personal computer system associated with a visual display, the method including operations comprising:
displaying on the visual display an image of a user interface, the image displayed with respect to a reference coordinate system that is stationary with respect to the visual display;
in a unidirectional interaction mode, in which the visual display shows multiple graphical controls in constant locations with respect to the reference coordinate system, wherein selection of each one of the multiple graphical controls not in motion using a non-gaze input causes a respective predefined input operation to occur;
receiving a mode transition command from a viewer of the visual display, wherein the mode transition command triggers a transition from the unidirectional mode to a bidirectional interaction mode in which the transition causes the multiple graphical controls to be in motion with respect to the reference coordinate system;
in the bidirectional interaction mode:
determining a gaze point of the viewer relative to the visual display based on gaze point data provided by a gaze tracking system, the gaze point determined with respect to the reference coordinate system;
determining a first path including a first relative motion of a first graphical control and a second path including a second relative motion of a second graphical control, wherein the second relative motion is distinguishable from the first relative motion, wherein the first graphical control and the second graphical control are present at least in a neighborhood of the gaze point on the visual display, and wherein the neighborhood is substantially centered on the gaze point and is smaller than an entirety of the visual display;
determining a gaze motion based on relative movements of the gaze point;
comparing the gaze motion to each of the first path and the second path; and
in response to determining a match between the gaze motion and either the first path or the second path, indicating the respective predefined input operation associated with the matching one of the first graphical control or the second graphical control by sending a corresponding instruction to the operating system or to an application executing thereon; and
transitioning from the bidirectional interaction mode to the unidirectional interaction mode when one or more criteria are met, causing the multiple graphical controls to be in constant locations.

15. A computer program product comprising a non-transitory computer-readable medium with instructions for causing a programmable computer to perform the method of claim 14.

16. The method of claim 14, wherein the operations further comprise:
measuring a current dwell time in the bidirectional interaction mode; and
initiating the transition from the bidirectional interaction mode to the unidirectional interaction mode, when the match has not been determined before the dwell time exceeds a predefined threshold.

17. The method of claim 14, wherein the operations further comprise displaying a stationary equivalent of at least one of the graphical controls in the unidirectional interaction mode.

18. The method of claim 14, wherein the match between the gaze motion and either the first path or the second path is determined based on a motion property which is one in the group comprising: speed, acceleration, direction, curvature.

19. The method of claim 14, wherein the gaze tracking system provides the gaze point data by means of a configurable mapping having as input pre-processed eye image data; and
wherein, in the bidirectional interaction mode, the gaze tracking system is operable to calibrate said configurable mapping by equating simultaneous values of the gaze point of the viewer and a location of the matching graphical control in motion.

20. The method of claim 19, wherein the calibrating is delayed until after transitioning to the unidirectional interaction mode.

* * * * *